United States Patent
Koo et al.

(10) Patent No.: US 8,374,155 B2
(45) Date of Patent: Feb. 12, 2013

(54) POWER LOADING TRANSMIT BEAMFORMING IN MIMO-OFDM WIRELESS COMMUNICATION SYSTEMS

(75) Inventors: Chang-Soo Koo, Melville, NY (US); Nirav B. Shah, Syosset, NY (US); Robert L. Olesen, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 13/018,062

(22) Filed: Jan. 31, 2011

(65) Prior Publication Data

US 2011/0122958 A1 May 26, 2011

Related U.S. Application Data

(63) Continuation of application No. 11/683,797, filed on Mar. 8, 2007, now Pat. No. 7,881,265.

(60) Provisional application No. 60/782,459, filed on Mar. 15, 2006.

(51) Int. Cl.
*H04W 4/00* (2009.01)
*H04B 1/00* (2006.01)
*H04B 15/00* (2006.01)

(52) U.S. Cl. ...................... 370/334; 455/63.4

(58) Field of Classification Search .......... 370/334, 370/328; 455/63.4, 522; 375/267
See application file for complete search history.

(56) References Cited

U.S. PATENT DOCUMENTS

| | | | |
|---|---|---|---|
| 6,862,271 | B2 | 3/2005 | Medvedev et al. |
| 2003/0134605 | A1* | 7/2003 | Kim et al. ............ 455/101 |
| 2003/0139196 | A1* | 7/2003 | Medvedev et al. ...... 455/522 |
| 2004/0042439 | A1 | 3/2004 | Menon et al. |
| 2004/0082356 | A1* | 4/2004 | Walton et al. ......... 455/522 |
| 2005/0047517 | A1 | 3/2005 | Georgios et al. |
| 2005/0185574 | A1 | 8/2005 | Codreaun et al. |
| 2006/0199604 | A1* | 9/2006 | Walton et al. ......... 455/522 |
| 2007/0147535 | A1* | 6/2007 | Niu et al. ............. 375/267 |

FOREIGN PATENT DOCUMENTS

| | | |
|---|---|---|
| EP | 1 615 384 | 1/2006 |
| WO | 2005/062729 | 7/2005 |

OTHER PUBLICATIONS

IEEE, IEEE P802.11n/D0.02 Draft Amendment to STANDARD [for] Information Technology—*Telecommunications and Information Exchange Between System—Local and Metropolitan Networks—Specific Requirements*—Part 11: Wireless LAN Medium Access Control (MAC) and Physical Layer (PHY) Specifications: Enhancements for Higher Throughput, (Feb. 2006).

IEEE, IEEE P802.11n/D1.05 Draft Amendment to STANDARD for Information Technology—*Telecommunications and Information Exchange Between Systems—Local and Metropolitan Area Networks—Specific Requirements*—Part 11: Wireless LAN Medium Access Control (MAC) and Physical Layer (PHY) Specifications: Amendment <number>: Enhancements for Higher Throughput, (Oct. 2006). IEEE, IEEE P802.11n/D0.02 Draft Amendment to STANDARD [FOR] Information Technology—Telecommunications and Information Exchange Between System-Local and Metropolitan Networks-Specific Requirements—Part 11: Wireless LAN Medium Access Control (MAC) and Physical Layer (PHY) Specifications: Enhancements for Higher Throughput, (Feb. 2006).

IEEE, IEEE P802.11,/D1.05 Draft Amendment to STANDARD for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment <number>: Enhancements for Higher Throughput, (Oct. 2006).

\* cited by examiner

*Primary Examiner* — Meless N Zewdu
*Assistant Examiner* — Edd Rianne Plata
(74) *Attorney, Agent, or Firm* — Volpe and Koenig, P.C.

(57) ABSTRACT

A method is disclosed for tuning a beamformed signal in wireless communications including a plurality of sub-carriers and a plurality of eigenbeams. The method includes adjusting a total gain of each of the plurality of sub-carriers and eigenbeams, and applying the adjusted total gain to each of the sub-carriers and each of the eigenbeams.

8 Claims, 2 Drawing Sheets

POWER LOADING TRANSMIT BEAMFORMING IN MIMO-OFDM WIRELESS COMMUNICATION SYSTEMS

CROSS REFERENCE TO RELATED APPLICATION

This application claims the benefit of U.S. application Ser. No. 11/683,797, filed Mar. 8, 2007 which in turn claims the priority benefit of provisional application No. 60/782,459, filed Mar. 15, 2006 which is incorporated by reference as if fully set forth.

FIELD OF INVENTION

The present invention relates generally to the field of wireless communications systems. More specifically, the present invention relates to a method and apparatus for beamforming in a multiple-in/multiple-out (MIMO) orthogonal frequency division multiplexing (OFDM) wireless communication system.

BACKGROUND

In multiple in-multiple out (MIMO) orthogonal frequency division multiplexing (OFDM) wireless communication systems, transmit beamforming (TxBF) typically will improve signal-to-noise ratio (SNR) at a receiver. Transmit beamforming may provide a higher throughput and in turn allow for higher data rates as compared to, for example, direct mapping or spatial spreading.

Channel state information (CSI) typically must be available at the transmitter in order to employ TxBF techniques. A transmitter may estimate CSI by assuming channel reciprocity, or the transmitter may determine CSI from a receiver by way of signaling. It should be noted that channel reciprocity requires radio calibration which could be achieved by exchanging sounding packets. The transmitter may then perform beamforming based on the estimation of received CSI and select a proper modulation and coding scheme (MCS) based on the MCS index recommended by the receiver through signaling.

Prior art wireless communication receivers utilize MCS indexes in order to match code rate and modulation as close as possible to channel conditions. However, since the number of MCS indexes is limited, MCS indexes selected by the receiver may not closely match the existing channel conditions. Prior art receivers select from a limited set of MCS indexes to match rate and modulations as closely as possible to channel conditions.

Therefore, it would be desirable to have a method and apparatus for redistributing power for all sub-carriers and eigenbeams within the set of selected MCS indexes. This would provide a fine adjustment to the MCS indexes in order to closely match current channel conditions.

SUMMARY

The present invention is a method and apparatus for beamforming in MIMO-OFDM wireless communications. In a preferred embodiment, power loading is used to redistribute power for all sub-carriers and eigenbeams, thus providing modulation and coding schemes (MCS) indexes with fine adjustments in order to more closely match the current channel conditions. Performance is thereby increased in terms of decreased packet error rates (PER) and higher throughput.

BRIEF DESCRIPTION OF THE DRAWINGS

A more detailed understanding of the invention may be had from the following description of a preferred embodiment, given by way of example and to be understood in conjunction with the accompanying drawing(s) wherein.

DETAILED DESCRIPTION OF THE PREFERRED EMBODIMENT

Although the features and elements of the present invention are described in the preferred embodiments in particular combinations, each feature or element can be used alone (without the other features and elements of the preferred embodiments) or in various combinations with or without other features and elements of the present invention.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (Base station), or any other type of interfacing device capable of operating in a wireless environment.

Figure 1:
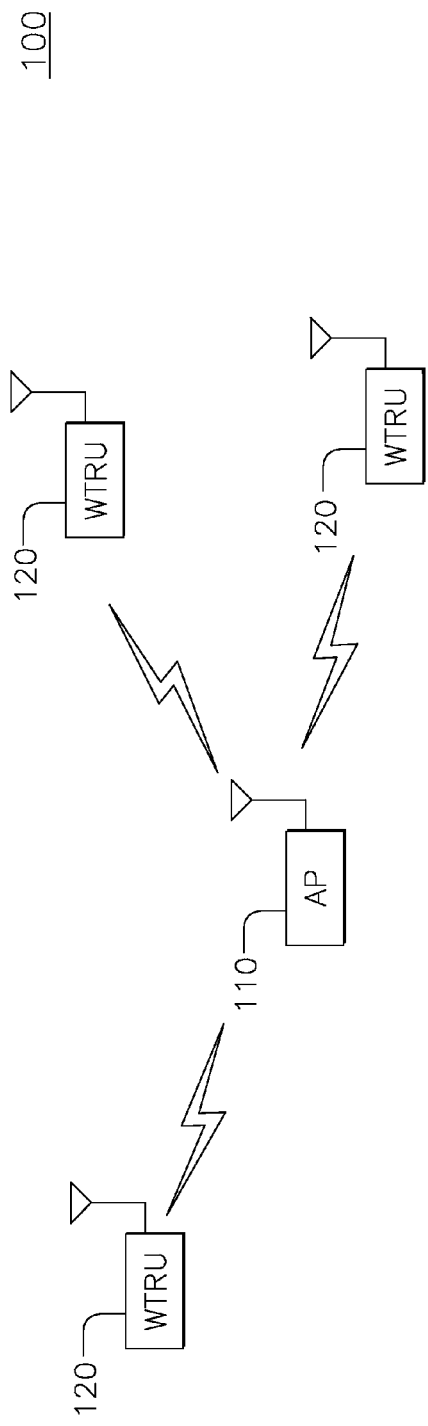
FIG. 1 shows an exemplary wireless system, including an access point (AP) and a plurality of wireless transmit/receive units (WTRUs), configured in accordance with the present invention.

Turning now to FIG. 1, there is shown an exemplary wireless communication system 100 configured in accordance with the present invention. The wireless communication system 100 includes a plurality of wireless communication devices, such as an AP 110 and a plurality of WTRUs 120, capable of wirelessly communicating with one another. Although the wireless communication devices depicted in the wireless communication system 100 are shown as APs and WTRUs, it should be understood that any combination of wireless devices may comprise the wireless communication system 100. That is, the wireless communication system 100 may comprise any combination of APs, WTRUs, stations (STAs), and the like.

For example, the wireless communication system 100 may include an AP and client device operating in an infrastructure mode, WTRUs operating in ad-hoc mode, nodes acting as wireless bridges, or any combination thereof. Additionally, in a preferred embodiment of the present invention, the wireless communication system 100 is a wireless local area network (WLAN). However, the wireless communication system 100 may be any other type of wireless communication system.

Figure 2:
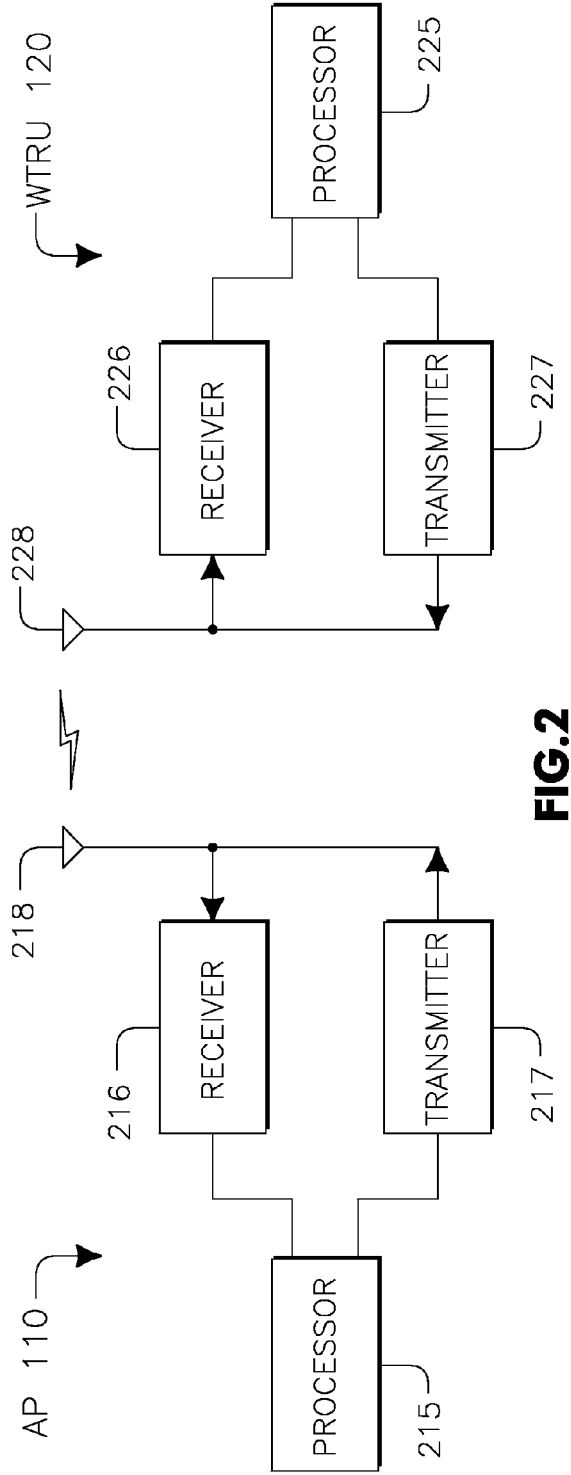
FIG. 2 is a functional block diagram of an AP and a WTRU of the wireless communication system of FIG. 1.

FIG. 2 is a functional block diagram of an AP 210 and a WTRU 120 of the wireless communication system 100 of FIG. 1. As shown in FIG. 2, the AP 110 and the WTRU 120 are in wireless communication with one another. In addition to the components that may be found in a typical AP, the AP 110 includes a processor 215, a receiver 216, a transmitter 217, and an antenna 218. The processor 215 is configured to generate, transmit, and receive data packets in accordance with the present invention. The receiver 216 and the transmitter 217 are in communication with the processor 215. The antenna 218 is in communication with both the receiver 216 and the transmitter 217 to facilitate the transmission and reception of wireless data.

Similarly, in addition to the components that may be found in a typical WTRU, the WTRU 120 includes a processor 225, a receiver 226, a transmitter 227, and an antenna 228. The processor 225 is configured to generate, transmit, and receive data packets in accordance with the present invention. The receiver 236 and the transmitter 227 are in communication with the processor 225. The antenna 228 is in communication with both the receiver 226 and the transmitter 227 to facilitate the transmission and reception of wireless data.

The present invention may be implemented in a WTRU or base station. The present invention is applicable to both the physical layer (PHY) and the digital baseband. The present invention may be implemented in wireless communication systems employing the following air interfaces: wideband code division multiple access (WCDMA), time division duplex (TDD), including HCR, LCR, and TDS-CDMA, frequency division duplex (FDD), and IEEE 802.11n air interfaces.

In a currently preferred embodiment of the invention, power loading in accordance with the present invention is applied to the eigen beamforming mode of a MIMO-OFDM wireless communication system. Preferably, power loading is only applied while closed loop power control is in operation, and when accurate and recent CSI is available for use in precoding for eigen beamforming.

Figure 3:
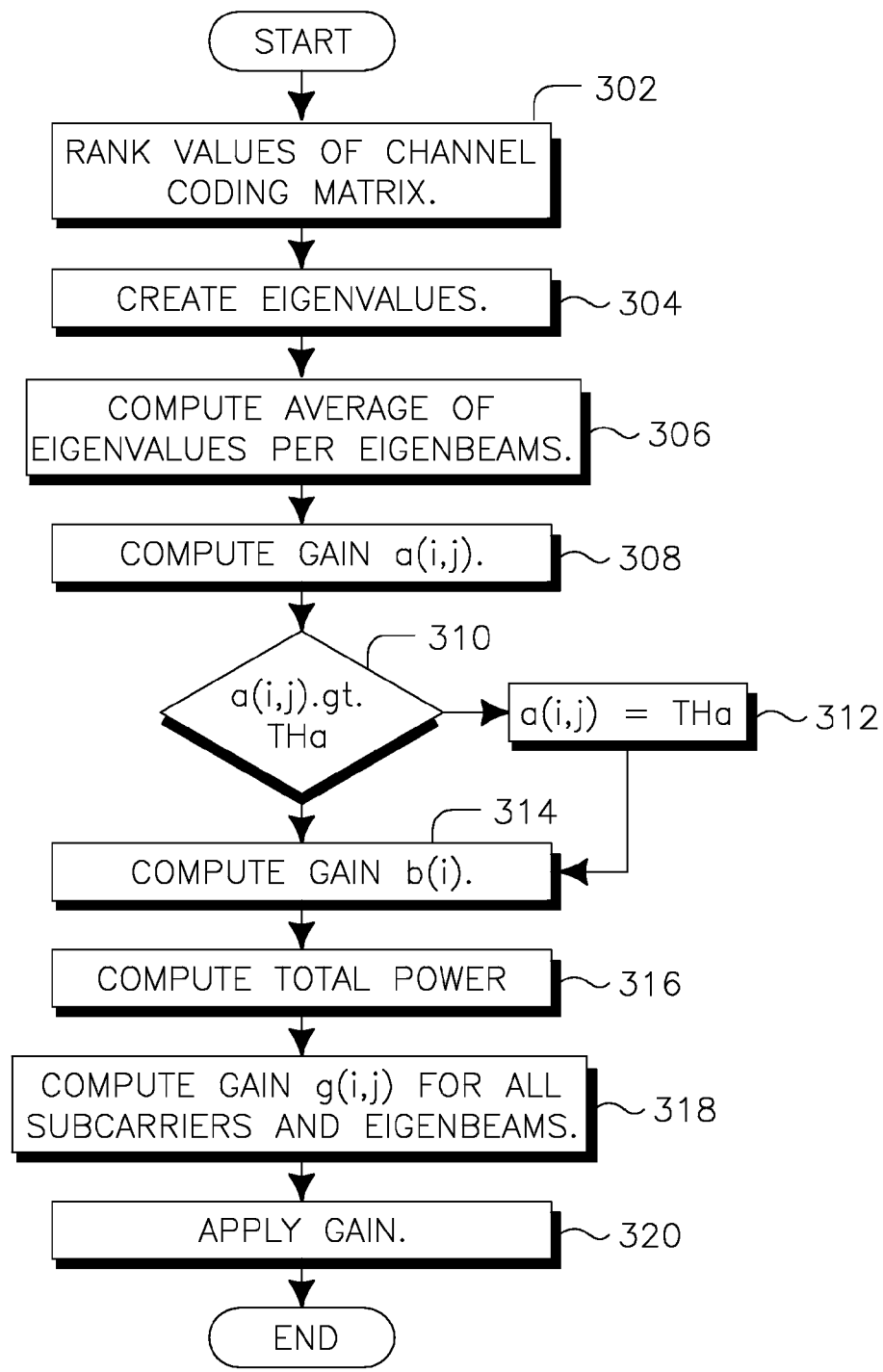
FIG. 3 is a flow diagram of a method of power loading in accordance with one embodiment of the present invention.

FIG. 3 is a flow diagram of a power loading method 300 in accordance with one embodiment of the present invention. The method 300 begins by ranking the eigenvalues of the channel correlation matrix using a channel estimation matrix per subcarrier as shown at step 302 and equation (1).

$$(\lambda_1(k) > \lambda_2(k) > \ldots > \lambda_{nT}(k));  \quad \text{Equation (1)}$$

At step 304, create eigenbeams ($E_1, E_2, \ldots, E_{nT}$) by grouping the ranked eigenvalues for all subcarriers according to equation (2).

$$E_i = \{\lambda_i(1), \lambda_i(2), \ldots, \lambda_i(K)\} \text{ for } i=1, 2, \ldots, nT  \quad \text{Equation (2)}$$

In equation (2), K is the number of sub-carriers, nT is the number of eigenbeams/data streams, and $\lambda_i(j)$ is the $i^{th}$ eigenvalue of the $j^{th}$ subcarrier.

In step 306, the average of the eigenvalues per eigenbeam is computed according to equation (3).

$$\lambda_i^{av} = \frac{1}{K} \sum_{j=1}^{K} \lambda_i(j) \text{ for } i = 1, 2, \ldots, nT. \quad \text{Equation (3)}$$

In step 308, a gain a(i,j) is computed such that $$a(i, j) = \sqrt{\frac{\lambda_i^{av}}{\lambda_i(j)}}$$

for i=1, 2, ..., nT and j=1, 2, ..., K. At step 310, the gain a(i,j) is compared to a threshold. If the gain a(i,j) is greater than a threshold, $TH_a$, at step 312, a(i,j) is set equal to $TH_a$. This puts a limit on the gain and limits the power loading to very poor sub-carriers.

At step 314, a gain b(i) is computed such that $$b(i) = G_{mod} G_{code} \sqrt{\frac{\lambda_1^{av}}{\lambda_i^{av}}},$$

where $G_{mod}$ is a relative modulation order of $i^{th}$ eigenbeam to the first/strongest eigenbeam and $G_{code}$ is a relative channel coding gain of $i^{th}$ eigenbeam to the first/strongest eigenbeam. By way of example, M-QAM modulation requires, approximately, an additional 5 dB by adding one more bit to a symbol. If the first/strongest eigenbeam uses 256-QAM and the second eigenbeam uses 64-QAM, $G_{mod}$ is approximately $10^{5(N_1^{64QAM} - N_2^{256QAM})/20} = 1/\sqrt{10}$, where $N_1^{64QAM} = \log_2 64$ and $N_1^{256QAM} = \log_2 256$. Likewise, $G_{code}$ is computed based on code gain between two eigenbeams.

Since the total power with the new gains (a and b) must be the same as the original power with unit gain, at step 316, the equation $$c = \frac{k \sum_{i=1}^{nT} \lambda_i^{av}}{\sum_{i=1}^{nT} \sum_{j=1}^{K} b^2(i) a^2(i, j) \lambda_i(j)}$$

is solved, resulting in a value for a variable c. At step 318, gain g(i,j) is computed for all sub-carriers and eigenbeams such that $g(i, j) = \sqrt{c} b(i) a(i,j)$ for i=1, 2, ..., nT and j=1, 2, ..., K. At step 320, the gain g(i,j) is applied to all sub-carriers and eigenbeams of long training fields (LTFs) and data OFDM symbols.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module

What is claimed is:

1. A method for power loading multiple-input/multiple-output (MIMO) orthogonal frequency division multiplexing (OFDM) wireless communications, the method comprising:
    calculating eigenvalues of a channel correlation matrix for each of a plurality of subcarriers;
    ranking the eigenvalues;
    grouping same ranked eigenvalues across all subcarriers to generate a plurality of eigenbeams;
    calculating an average eigenvalue for each eigenbeam;
    calculating a first gain for each subcarrier and eigenbeam based on the average eigenvalue for each eigenbeam relative to each eigenvalue;
    calculating a second gain for each eigenbeam based on a strongest average eigenvalue relative to each average eigenvalue;
    calculating a third gain for each subcarrier and eigenbeam based on the first gain and the second gain; and
    applying the third gain to each corresponding subcarrier and eigenbeam.

2. The method of claim 1, wherein the second gain is calculated based on a relative modulation order for each eigenbeam relative to a strongest eigenbeam and a relative coding gain for each eigenbeam relative to the strongest eigenbeam.

3. The method of claim 1, further comprising:
    calculating a constant based on the first gain, the second gain, the eigenvalues, and average eigenvalues, wherein the third gain is calculated based on the constant.

4. The method of claim 1, further comprising:
    comparing the first gain to a predetermined threshold; and
    setting the first gain to the threshold on a condition that the first gain is greater than the threshold.

5. An access point (AP), the AP comprising a processor configured to:
    calculate eigenvalues of a channel correlation matrix for each of a plurality of subcarriers;
    rank the eigenvalues;
    group same ranked eigenvalues across all subcarriers to generate a plurality of eigenbeams;
    calculate an average eigenvalue for each eigenbeam;
    calculate a first gain for each subcarrier and eigenbeam based on the average eigenvalue for each eigenbeam relative to each eigenvalue;
    calculate a second gain for each eigenbeam based on a strongest average eigenvalue relative to each average eigenvalue;
    calculate a third gain for each subcarrier and eigenbeam based on the first gain and the second gain; and
    apply the third gain to each corresponding subcarrier and eigenbeam.

6. The AP of claim 5, wherein the processor is further configured to calculate the second gain based on a relative modulation order for each eigenbeam relative to a strongest eigenbeam and a relative coding gain for each eigenbeam relative to the strongest eigenbeam.

7. The AP station of claim 6, wherein the processor is further configured to
    calculate a constant based on the first gain, the second gain, the eigenvalues, and average eigenvalues, and calculate the third gain based on the constant.

8. The AP of claim 5, wherein the processor is further configured to:
    compare the first gain to a predetermined threshold; and
    set the first gain to the threshold on a condition that the first gain is greater than the threshold.

* * * * *